United States Patent
Shahar et al.

[11] Patent Number: 6,112,232
[45] Date of Patent: Aug. 29, 2000

[54] DATA COMMUNICATION DEVICE FOR CATV NETWORKS

[75] Inventors: Menashe Shahar, Ramat Gan; Claude Albo; Hillel Hendler, both of Jerusalem, all of Israel

[73] Assignee: Phasecom Ltd., Jerusalem, Israel

[21] Appl. No.: 09/013,919

[22] Filed: Jan. 27, 1998

[51] Int. Cl.[7] .................................................. H09N 7/12
[52] U.S. Cl. ........................... 709/217; 348/6; 348/10; 348/12; 375/222; 370/465
[58] Field of Search .................... 348/6; 455/3.1; 375/222; 370/465, 485; 320/493–494

[56] References Cited

U.S. PATENT DOCUMENTS

| | | | |
|---|---|---|---|
| 5,347,304 | 9/1994 | Moura et al. | 348/12 |
| 5,410,535 | 4/1995 | Yang et al. | 370/13 |
| 5,412,352 | 5/1995 | Graham . | |
| 5,481,562 | 1/1996 | Pearson et al. | 375/222 |
| 5,488,412 | 1/1996 | Majeti et al. . | |
| 5,499,046 | 3/1996 | Schiller et al. | 348/6 |
| 5,563,908 | 10/1996 | Kaku et al. | 375/222 |
| 5,577,087 | 11/1996 | Furuya | 375/222 |
| 5,592,540 | 1/1997 | Beveridge | 348/6 |
| 5,642,155 | 6/1997 | Cheng | 348/12 |
| 5,675,732 | 10/1997 | Majeti et al. | 370/118 |
| 5,719,872 | 2/1998 | Dubberly et al. | 455/3.1 |
| 5,805,636 | 9/1998 | Rao et al. | 375/222 |
| 5,825,829 | 10/1998 | Borazjani et al. | 375/222 |
| 5,896,414 | 4/1999 | Meyer et al. | 375/222 |

*Primary Examiner*—Andrew I. Faile
*Assistant Examiner*—Reuben Brown
*Attorney, Agent, or Firm*—McDermott, Will & Emery

[57] ABSTRACT

A symmetric full duplex data communication device known as a communication interface unit (CUI) permitting transmission of signals on CATV infrastructure or on amplitude modulated (AM) analog fiber in a variety of configurations. The communication interface unit is capable of interfacing to a variety of signal types, including but not limited to: E1 (G.703), T1 NI and DSX-1), V.35 (N×64) or Ethernet. The CUI transmits in the upstream direction in the frequency range of 5 to 50 MHz and receives in the downstream direction in the range of 50 to 860 MHz. The communication interface unit is bandwidth efficient by the use of digital filters in the receive signal path. Management of the communication interface unit is performed via a GMSK internal modem under control of the same CPU. The GMSK internal modem is used to establish a control channel to a network management system (NMS). The control channel operates at a maximum rate of 38.4 Kbps and at a bandwidth of 50 KHz.

19 Claims, 3 Drawing Sheets

DATA COMMUNICATION DEVICE FOR CATV NETWORKS

FIELD OF THE INVENTION

The present invention relates generally to data communication systems and more particularly relates to systems for transmission of data on a CATV network.

BACKGROUND OF THE INVENTION

Currently the demand for higher rate data communication services is increasing at a very high pace. The need for higher data rates is being driven by user applications such as multimedia, large file transfers, heavy World Wide Web usage (i.e., surfing), video conferencing, Internet video telephony, Internet voice telephony and other bandwidth intensive applications. For example, it requires a substantial amount of data to define a high resolution color picture to be displayed on the monitor of a user's personal computer. It takes an even greater amount of data if the picture is to be animated.

At present, conventional analog modems operating over the public switched telephone network (PSTN) in use in most residential settings can transmit data at a rate of 28,800 bps. Analog modems that transmit at 33,600 bps exist but have not gained widespread use due to the time lag until Internet service providers (ISPs) purchase and install faster modem equipment into their infrastructure.

In addition, such data rates are too slow to accommodate heavy multimedia applications. In many applications, the computer user transmits relatively small amounts of information comprising mainly requests for information to a service provider. Thus, a lower speed channel can be utilized to provide the upstream communications between the user and the service provider without noticeable delays.

Currently, much attention is being directed to using once mainly unidirectional analog data transmission systems, such as the community antenna television (CATV) cable system, for bi-directional data communications. It is estimated that there are over 70 million households in the United States that are wired for cable TV. Virtually all the information that enters the home over the cable is in the form of analog television signals. Some subscribers have the ability to send short commands for ordering pay per view or other types of programming. Most set top cable boxes, however, do not provide sufficient upstream channel capacity for practical use by subscribers for data transmission.

Numerous applications for use over the cable are currently being developed. These include, for example, conventional telephony services, digital video, high speed data, various consumer purchasing services, consumer voting services, movie rentals, games, educational courses, travel services, financial services (e.g., stock trading), etc.

Conventional cable transmission systems provide one way transmission from the head-end to the subscriber's residence using a downstream channel in the range of 50 to 860 MHz. In order to satisfy the requirement of interactivity on the information superhighway, cable operators has allocated a reverse channel or upstream channel in the frequency spectrum of 5 to 50 MHz.

Currently, RF to the home is the most common type of broadband service installed with the major service provided being cable television. In addition, the demand for high speed data access from homes and small businesses, i.e., the 'on-ramps' to the information highway, is increasing. There is a growing need to provide facility transport between customer premises and the head end location. A facility such as T1 (1.544 Mbps) or E1 (2.048 Mbps) can be used to connect primary multiplexing equipment providing communication services to large businesses.

Communication systems for transmitting data over CATV networks are known in the art. U.S. Pat. No. 5,488,412, issued to Majeti et al., teaches a home controller for receiving signals from the cable television system and utilizing a cable demodulator tuned to the RF frequency of the channel which carries the data information. The cable demodulator demodulates the RF encoded signals into conventional baseband digital form which are transmitted to a frame receiver which decodes frames addressed to individual users. If a frame is addressed to the user (i.e., subscriber), the frame receiver transmits the corresponding data using a transceiver (i.e., Ethernet) to the user's personal computer.

U.S. Pat. No. 5,412,352, issued to Graham, teaches a modulator for data to be transmitted in a reverse or upstream channel in a cable transmission system. The modulator requires a single frequency translation from baseband to a selected RF channel, thus eliminating conventional intermediate frequency (IF) translation. The modulator uses a differential quadrature phase shift keying encoder with transversal finite impulse response (FIR) filters and interpolation filters to connect the phase shift keyed data to a single mixer stage for directly translating the baseband signal to an RF signal in the channel spectrum of 5 to 40 MHz.

SUMMARY OF THE INVENTION

The present invention is a symmetric full duplex data communication device known as a communication interface unit permitting transmission of signals on CATV infrastructure or on amplitude modulated (AM) analog fiber in a variety of configurations. The communication interface unit of the present invention permits communications from a street cabinet, i.e., the curb, or customer site to the head end of the CATV network. This configuration is applicable for telephony service distribution or data transmission over a CATV network via 'RF to the curb' or 'RF to the home'. Also permitted is communications between two customer sites connected through a CATV network, thus enabling the establishment of virtual private networks (VPNs). In addition, the communication interface unit permits communication between two head end facilities of the CATV network. Further, communications between cellular base stations and associated switching centers is enabled using the communication interface unit and the broadband CATV network as an intermediate link.

The communication interface unit is capable of interfacing to a variety of signal types, not limited to: E1 (G.703), T1 NI and DSX-1), V.35 (N×64) or Ethernet. The communication interface unit transmits in the upstream direction in the frequency range of 5 to 50 MHz and receives in the downstream direction in the range of 50 to 860 MHz. The communication interface unit is bandwidth efficient by the use of digital filters in the receive signal path. This gives the communication interface unit a better spectral efficiency when compared with prior art point-to-point cable modems.

Management of the communication interface unit is performed via a GMSK internal modem under control of the same CPU. The GMSK internal modem is used to establish a control channel to a network management system (NMS). The control channel operates at a maximum rate of 38.4 Kbps and at a minimum bandwidth of 50 KHz. The NMS comprises centralized control equipment consisting of a personal computer (PC) running a management application. The NMS can be installed at any site wherein an interface exists to at least one communication interface unit.

There is therefore provided in accordance with the present invention a data communication device for transmitting data from a terminal equipment over an analog based communication network, the device for transmitting data received from the network to the terminal equipment, the device comprising first transmitter means for interfacing to the terminal equipment, receiving data to be transmitted, modulating and upconverting the data for transmission onto an upstream data channel over the network, first receiver means for receiving data from the network over a downstream data channel. downconverting and demodulating the data and interfacing to the terminal equipment for transmission of the received data and splitter means for interfacing the first transmitter means and the first receiver means to the network.

The device further comprises control means for managing and configuring the device in accordance with commands received from a centralized network management system (NMS), second transmitter means for receiving control data to be transmitted from the control means, modulating and upconverting the control data for transmission onto an upstream control channel over the network, second receiver means for receiving control data from the network over a downstream control channel, downconverting and demodulating the control data and interfacing to the terminal equipment for transmission of the received data to the control means and splitter means for interfacing the second transmitter means and the second receiver means to the network.

The first transmitter means may comprise transmitter interface means adapted to interface to E1 terminal equipment, T1 terminal equipment, DSX-1 terminal equipment, V.35 terminal equipment or Ethernet terminal equipment.

The first receiver means comprises receiver interface means adapted to interface to E1 terminal equipment, T1 terminal equipment, DSX-1 terminal equipment, V.35 terminal equipment or Ethernet terminal equipment.

The first transmitter means comprises a transmitter interface for interfacing with the terminal equipment and adapted to received data therefrom, scrambling means for scrambling data input from the transmitter interface, forward error correcting code encoding means for encoding the data output from the scrambling means with an error correcting code, modulator means for modulating a digital signal input thereto, D/A converter means for converting the digital output of the modulator means into an analog signal and upconverter means for modulating the analog signal up to an RF frequency in the range 50 to 860 MHz for transmission over the network.

The modulator comprises a quadrature phase shift keying (QPSK) modulator. Further, the first receiver means comprises downconverter means for demodulating an RF signal in the range 50 to 860 MHz received over the network, A/D converter means for converting the analog output of the downconverter means into a digital signal, demodulator means for demodulating a digital signal input thereto, forward error correcting code decoding means for decoding the data output from the demodulator means, descrambling means for descrambling data input from the forward error correcting code decoding means and a receiver interface for interfacing with the terminal equipment and adapted to transmit data thereto.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Notation | Definition |
| --- | --- |
| AAL5 | ATM Adaptation Layer 5 |
| AIS | Alarm Indication Signal |
| AM | Amplitude Modulation |
| AMI | Alternate Mark Inversion |
| ARP | Address Resolution Protocol |
| ATM | Asynchronous Transfer Mode |
| B8ZS | Bipolar 8 Zero Substitution |
| BER | Bit Error Rate |
| BIT | Built In Test |
| BPV | Bipolar Violation |
| CATV | Community Antenna Television |
| CDM | Cable Data Modem |
| CGW | CATV Gateway |
| CUI | Communication Interface Unit |
| CPU | Central Processing Unit |
| CRC | Cyclic Redundancy Code |
| DDS | Direct Digital Synthesizer |
| DHCP | Dynamic Host Configuration Protocol |
| DVB | Digital Video Broadcast |
| FEC | Forward Error Correction |
| FIR | Finite Impulse Response |
| HDB3 | High Density Bipolar of order 3 |
| HDLC | Data Link Control |
| HES | Head-end Subsystem |
| IF | Intermediate Frequency |
| IP | Internet Protocol |
| ISP | Internet Service Provider |
| LAN | Local Area Network |
| LBO | Line Build Out |
| LOS | Loss of Signal |
| LSB | Least Significant Bit |
| MAC | Media Access Control |
| MMI | Man Machine Interface |
| MPEG | Motion Picture Engineering Group |
| MUX | Multiplexor |
| NI | Network Interface |
| NIC | Network Interface Controller |
| NMS | Network Management System |
| NRZ | Non Return to Zero |
| PC | Personal Computer |
| PCB | Printed Circuit Board |
| PN | Pseudo Random Number |
| PSTN | Public Switched Telephone Network |
| QAM | Quadrature Amplitude Modulation |
| QPSK | Quadrature Phase Shift Keying |
| RF | Radio Frequency |
| SAR | Segmentation and Reassembly |
| SAW | Surface Acoustic Wave |
| SNMP | Simple Network Management Protocol |
| SRI | Slot Reception Indicator |
| TDMA | Time Division Multiple Access |
| TTL | Transistor Transistor Logic |
| UCU | Upstream Control Unit |
| UDU | Upstream Data Unit |
| VC | Virtual Circuit |
| VPN | Virtual Private Network |
| WAN | Wide Area Network |

General Description

Figure 1:
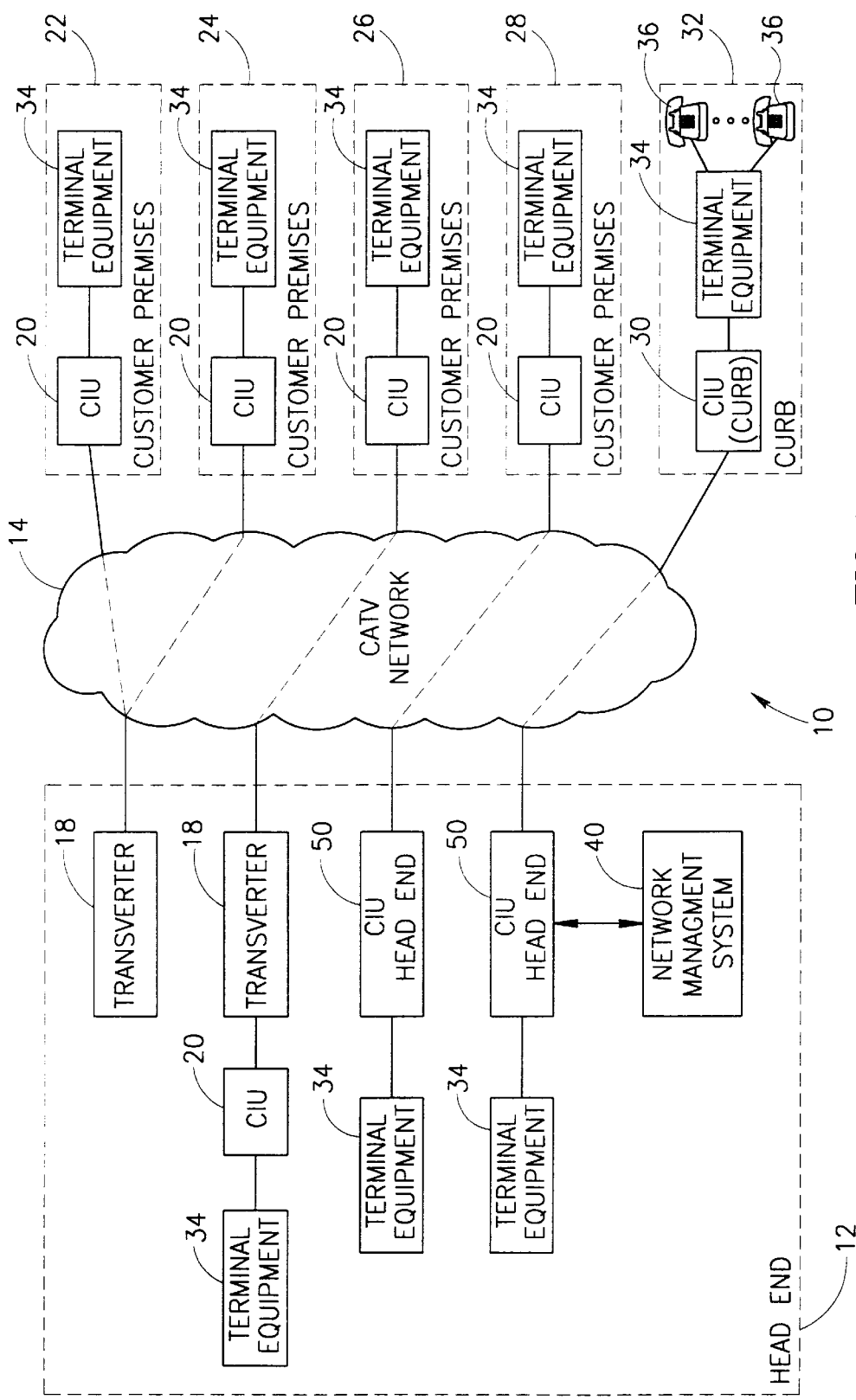
FIG. 1 is a high level block diagram illustrating a data over cable communication systems constructed utilizing the communication interface unit of the present invention.

A high level block diagram illustrating a data over cable communication systems constructed utilizing the communication interface unit of the present invention is shown in FIG. 1. The communication interface unit (CUI) of the present invention is capable of being connected to the CATV network at any point on the network. The communication interface unit transmits on an upstream channel in the range of 5 to 50 MHz and receives on a downstream channel in the range of 50 to 860 MHz.

An example CATV based communication system, generally referenced 10, is shown comprising a head end facility 12, CATV network 14, a plurality of customer premises 22, 24, 26, 28 and the curb 32. In each configuration, each CUI is connected to some type of terminal equipment (network terminal). The terminal equipment are the 'consumers' in the network and may comprise, for example, a router in a local network communication application, a channel bank in a telephony application, a data multiplexor, a channel bank for voice and data in an application for a private network, any LAN/WAN networking or telecom equipment or other device communicating via E1/NI/DSX-1/V.35/Ethernet.

In one configuration, two communication interface units 20, one in customer premise 22 and the other in customer premises 24, communicate with each other via a transverter 18 in the head end 12. The transverter is a conventional communication device that permits two communication interface units to communicate over the CATV network. The transverter functions to forward the data received on the upstream channel from a first CUI to the downstream channel of a second CUI. Similarly, the data received on the upstream channel of the second CUI is placed on the downstream channel of the first CUI.

In a second configuration, the CUI 20 in customer premises 26 communicates with CUI 20 coupled to terminal equipment 34 in the head end via transverter 18. This is similar to the first configuration presented above, with the exception that the second CUI is in the head end and not at the customer premises. The transverter functions to cross swap the information on the upstream and downstream channels between the two CUIs.

A third configuration comprises the CUI 20 and terminal equipment coupled thereto in customer premises 28 coupled to CUI (Head End) 50 in the head end 12. The CUI (Head End) 50 is a communication interface unit with a transmitter adapted to transmit on the downstream channel rather than the upstream channel in as CUI 20. Similarly, the CUI (Head End) 50 is adapted to receive on the upstream channel as opposed to transmit as in the CUI 20.

In yet a fourth configuration, a CUI (Curb) 30 coupled to terminal equipment 34 communicates with CUI (Head End) 50 in the head end 12. The CUI (Curb) 30 is a CUI adapted to interface with terminal equipment commonly located at the curb or street cabinet, e.g., channel bank equipment 34 supporting a plurality of voice telephone lines 36. In addition, a network management system 40 is shown coupled to CUI (Head End) 50. The NMS is capable of communicating to any and all of the CUIs connected to the CATV network 14. The NMS is a PC based device that implements management functions such as conventional SNMP or other similar functioning management means for carrying out management activities. The NMS functions to facilitate remote control and supervisory operations over all the CUIs in the network.

Figure 2:
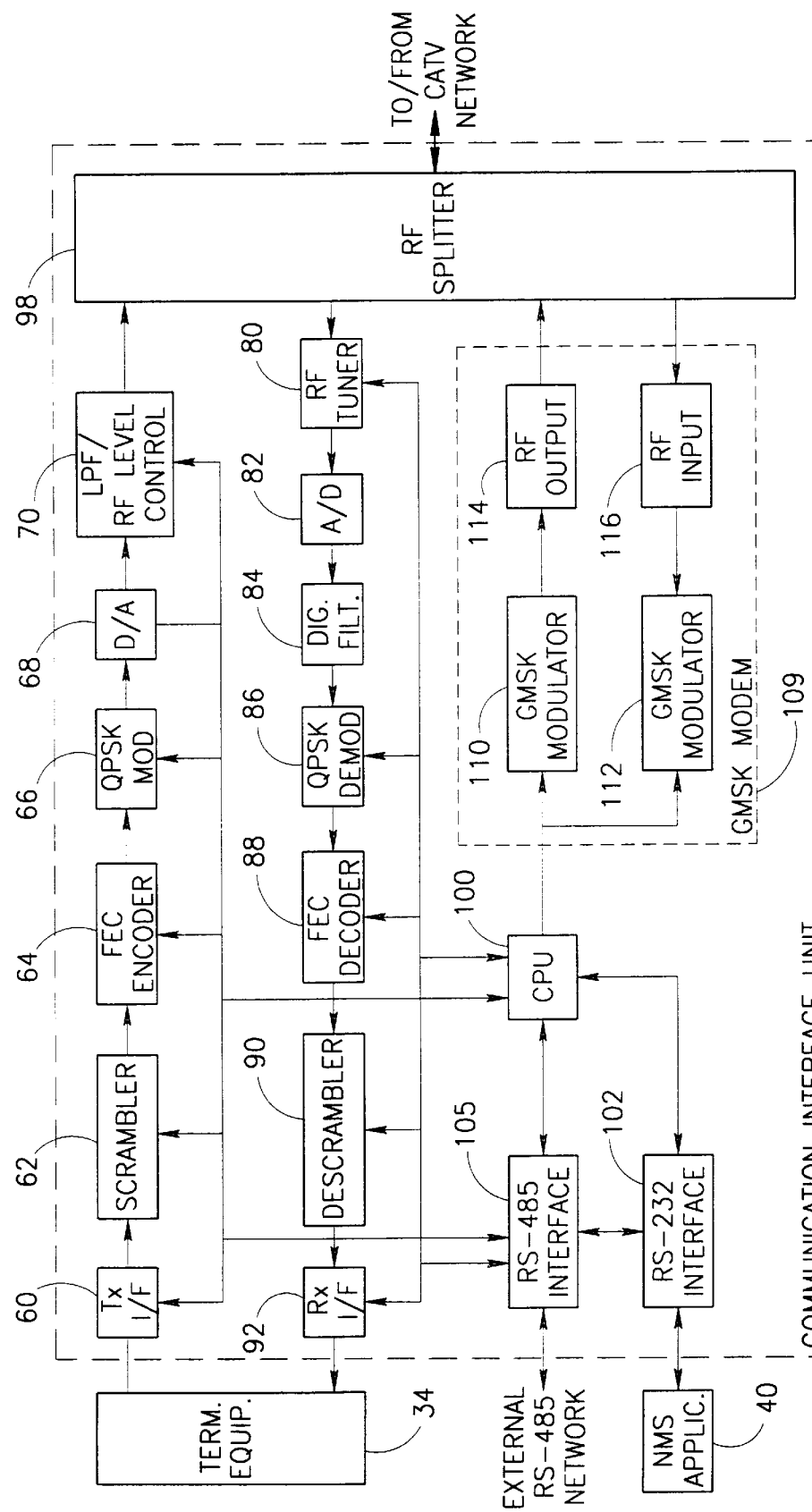
FIG. 2 is a block diagram illustrating the communication interface unit of the present invention in more detail.

The communication interface unit of the present invention will now be described in more detail. A block diagram illustrating the communication interface unit in more detail is shown in FIG. 2. The CUI is a full duplex device relaying independent bi-directional communications. The received by the CUI from the terminal is coded, modulated and relayed onto the CATV network 14 (FIG. 1) in the form of an RF signal, directed either to the head end or the customer premises. In addition, the RF signal received from the CATV network is demodulated, decoded and relayed as the original signal to the associated terminal. As described earlier, certain optional configurations of the CUI require the use of a transverter in the head end. The transverter functions to transvert, i.e., swap, the frequencies between the upstream and the downstream channels.

In the transmit direction, the CUI functions to handle the signal received form the terminal and transmit it onto the CATV network. The signal is received from the terminal using the appropriate standard protocol and at the rate associated with the particular type of interface: E1 signals under the G.703 standard at a rate of 2.048 Mbps; T1 signals under the T1.403 standard at a rate of 1.544 Mbps; NI and DSX-1 signals under the T.403 standard at a rate of 1.544 Mbps; V.35 signals under the V.35 standard at a rate of N×64 Kbps up to 2.048 Mbps and Ethernet 10BaseT signals using Manchester encoding/decoding at rates of 1.544 Mbps and 2.048 Mbps.

In addition, the CUI performs scrambling with the addition of redundant bits for error correction coding. The CUI performs pulse shaping via a raised cosine filter having a roll off of approximately 20%. QPSK modulation is used in the CUI with RF modulation to a frequency within the range of 5 to 50 MHz.

In the receive direction, the CUI handles the reception of the RF signal from the CATV network, demodulates and relays the signal as a signal in the appropriate format for the particular interface used. In particular, the RF signal is received within the frequency range of 50 to 860 MHz and mixed down to an IF frequency and filtered via a SAW filter in combination with a digital filter. The CUI performs QPSK demodulation, error correction and descrambling followed by conversion of the signal to the appropriate interface.

The implementation of a forward error correcting (FEC) code, for example, any suitable conventional error correcting code such as Reed Solomon or a convolutional code, serves to improve communication reliability. Preferably, the FEC algorithm used in the CUI for encoding and error correction is based upon a convolution encoder and Viterbi encoder having a length of 7 stages at a standard $171_8$, and $133_8$, both well known in the art. Alternatively, other conventional error correction techniques can be used such as Reed Solomon with 12% efficiency in accordance with the DVB standard as published in ETSI document ETS 300 429.

The CPU 100 within the CUI performs various functions such as supporting operation of the CUI via a local or remote PC, thus enabling activation of the communication interface from a remote control center; supporting various configuration functions; supporting status monitoring functions; and supporting diagnostic functions including loopbacks.

Remote control of the CUI is performed via an internal GMSK modem 109 which functions separately from the main modem of the CUI but is controlled by the same CPU 100. The GMSK modem 109 enables the establishment of a control channel to the network management system (NMS). The control channel operates at a maximum rate of 38.4 Kbps using a minimum bandwidth of 50 KHz. The control channel is common to all communication interfaces units in the network. Polling is the regime used in the control channel to coordinate communication among all the CUIs, with each CUI being allocated a unique 4 byte address for identification purposes. The polling of all the CUIs on the control channel is coordinated by the NMS, which may be located, for example, at the head end.

With reference to FIG. 2, the components of the CUI will now be described in more detail. The CUI 20 comprises a main modem having a transmit portion and a receive portion. The transmit portion comprises transmitter interface 60, scrambler 62, FEC encoder 64, QPSK modulator 66, D/A converter 68 and LPF/RF level control 70. The transmitter interface 60 functions to receive the signal output by the terminal equipment 34 and convert it to a TTL signal at a rate in accordance with the particular terminal interface in use. In the opposite direction, the receiver interface 92 converts the TTL signal to a signal appropriate for the particular type of terminal equipment 34. The transmitter interface 60 and the receiver interface 92 can be constructed on a small daughter PCB (not shown) having a suitable faceplate connected to the main PCB via a din Euroconnector. In this fashion, the daughter PCB can be customized to the particular type of interface, i.e., E1, T1, etc. Thus, multiple daughter PCBs can be used with the same main PCB.

Each transmitter/receiver interface comprises identification means to permit the CPU 100 to identify the particular type of interface being used. The transmitter/receiver interface performs signal validation by testing the signal in both direction. Signal faults are reported to the controller 100 and include, for example, bipolar violations (BPV) status for E1/T1 signals, loss of signal (LOS) status, alarm indication signal (AIS) status. LOS status for V.35 signals. Also reported is link integrity including the LAN Active Id and WAN Active Id, in addition to Tx/Rx activity for Ethernet. Note that in order to preserve complete communication path transparency, corrections are not performed on the signals transmitted from the terminal equipment (at the head end or the customer premises) in the event a fault is found. Synchronization is derived from the interfaces wherein the clock is extracted from the signal received from the terminal equipment.

The various interfaces supported by the CUI will now be described in more detail beginning with the E1 interface. The transmitter interface 60 and the receive interface 92 can be adapted to provide an E1 unbalanced interface. This interface signal has a rate of 2.048 Mbps and is encoded in accordance with the CCITT G.703 standard. The impedance is 75 ohms permitting connection of an unbalanced coaxial cable connector. Possible coding methods include HDB3, AMI or B8ZS.

The transmitter interface 60 and the receive interface 92 can be adapted to provide an E1 balanced interface. This interface signal has a rate of 2.048 Mbps and is encoded in accordance with the CCITT G.703 standard. The interface is a four wire interface having an impedance of 120 ohms permitting connection of a balanced connector such as DB9/DB15 or RJ48C. Possible coding methods include HDB3, AMI or B8ZS.

The transmitter interface 60 and the receive interface 92 can be adapted to provide a T1 balanced network interface (NI). This four wire interface has a rate of 1.544 Mbps and is encoded in accordance with ANSI T1.403 supporting three levels of LBO. The impedance is 100 ohms permitting a connection of a balanced connector such as DB9/DB15 or RJ48C. Possible coding methods include AMI or B8ZS.

The transmitter interface 60 and the receive interface 92 can be adapted to provide a T1 balanced cross connect interface. This four wire DS1 interface has a rate of 1.544 Mbps and is encoded in accordance with the ANSI T1.102 standard supporting five levels of pulse shaping. The interface has an impedance of 100 ohms permitting connection of a balanced connector such as DB9/DB15 or RJ48C. Possible coding methods include AMI or B8ZS.

The transmitter interface 60 and the receive interface 92 can be adapted to provide a standard V.35 interface including hand shake control signals suitable for interfacing with routers, data multiplexors and other terminal equipment at various data rates. The data rate is N×64 Kbps where N ranges from 1 to 32, i.e., 64 Kbps to 2,048 Kbps. The interface permits synchronization to a centralized clock in addition to providing an external clock output for synchronization purposes.

The transmitter interface 60 and the receive interface 92 can also be adapted to provide an Ethernet interface. This interface supports a full duplex UTP or AUI LAN interface in accordance with the IEEE 802.3 Ethernet standard at a rate of up to 2.048 Mbps. This interface functions as a self learning Ethernet bridge, learning MAC addresses present on the LAN and only forwarding frames destined for other LANs. The interface uses Manchester encoding and decoding and connects via a standard RJ45 (10BaseT) or D15 connector (10Base5).

The output of the transmitter interface 60 is coupled to the scrambler 62 which functions to insure randomness in the transmitted signal. This is particularly important for the transmission of information in the form of a cyclical series which would ordinarily create a spectrum of discrete lines. Scrambling provides for a relatively balanced distribution of the signal in the allocated frequency range. The scrambler 62 preferably performs conventional self synchronized scrambling with 20 levels in accordance with the V.35 standard. The scrambling polynomial function used is $1+X^{-3}+X^{-20}$.

The output of the scrambler 62 is input to the FEC encoder 64. FEC is needed since in some CATV networks, the carrier to noise ratio can be sufficiently low to reduce the BER to unacceptable levels. The error correction code is preferably based on convolutional encoding with a redundancy of 12.5%, i.e., a rate of ⅞ or a redundancy of 25%, i.e. a rate of ¾. Alternatively, an error correcting code compatible with the DVB standard, i.e., Reed Solomon block code with 12% redundancy, can be used. Whichever code is used, the maximum delay in the voice path should be taken into account. The CUI can be adapted to make FEC an option at the discretion of the user. The CUI can operate with or without FEC.

The output of the FEC encoder 64 is input to the QPSK modulator 66. The QPSK modulator functions to perform differential encoding on the input data. Differential encoding is performed wherein the phase shift of each symbol is relative to the phase of the previous symbol and not to the absolute relative phase. This obviates the need to search for a permanent relative phase as is the case when non-differential encoding is used. After scrambling and encoding, the data is QPSK modulated onto a frequency wave carrier for transmission onto the upstream channel. The signal is filtered by a relatively sharp filter having a raised cosine response with a roll-off of 20%. The output of the modulator 66 is a digital version of an RF signal in the range 5 to 50 MHz. Thus, the modulator 66 functions as a DDS.

The output of the QPSK modulator is then input to the D/A converter 68. The D/A converter 68 converts the digital RF signal into an analog baseband RF signal. The analog signal is then fed to LPF/RF level control 70. The signal is low pass filtered by a filter having a suitable cutoff frequency for an input signal with a maximum frequency of 50 MHz. Block 70 is also capable of adjusting the power level of the RF signal fed to the RF splitter 98. The transmission level of the RF output signal should be controlled in order to compensate for variable conditions within the CATV network.

The RF splitter 98 functions to couple the signal between the transmitter/receiver and the CATV network. On the receive side, the RF splitter couples the RF signal from the CATV network to the RF tuner 80. The tuner demodulates the signal to an IF frequency of, e.g., 32.9 MHz thus permitting the use of low cost standard SAW filters. The tuner is capable of demodulating input RF signals in the frequency range 50 to 860 MHz. The IF frequency signal is digitally sampled via A/D converter 82 with a sampling rate at least eight times greater than the symbol rate. The output of the A/D converter 82 is then digitally filtered by a FIR filter block 84. The FIR filter functions to eliminate interference from adjacent channels. After filtering, the digital signal is downconverted to baseband and demodulated via QPSK demodulator 86. The output of the QPSK demodulator 86 is decoded via FEC decoder 88. Following decoding, descrambling of the signal is performed by descrambler 90, thus recovering the originally transmitted digital data.

The CUI is adapted to be controlled both locally and remotely, both via a PC. Local control is via an RS-232 interface input to the CUI. Remote control is via the internal GMSK modem 109 that operates independently from the main modem. The channel provided by the GMSK modem provides configuration operations, diagnostic and status monitoring. The GMSK modem operates at a typical rate of 19.4 KHz using a 50 KHz bandwidth. The modem utilizes polling with each CUI identified by a unique 4 byte address. Any message sent or received by the NMS or CUI includes the source and destination address of the CUI or the NMS. The PC running the NMS application is connected to the CPU 100 of the CUI which is defined as a router in its configuration via RS-232 interface 102. Any messages sent to or received from the other CUIs are routed through the GMSK modem such that all other CUIs communicate through the CUI configured as a router. Note that only one CUI in a network system can be designated the router CUI.

Alternatively. RS-485 interface 105 coupled to CPU 100 can be used to tie a plurality of CUI's together. In this case, one designated CUI is connected to the NMS via the RS-232 interface 102. Other CUI's in the same location can be connected together via an RS-485 network bus. The CUI designated as the router communicates with other CUIs on the CATV network via GMSK modem.

The Guassian minimum shift keying (GMSK) modem 109 comprises a GMSK modulator 110 which receives data to be transmitted from the CPU 100. The modulated output is upconverted to a transmit frequency within the range of 5 to 50 MHz by the RF output section 114. The RF output is input to the RF splitter 98 which places the control channel RF signal onto the CATV network.

The GMSK modem 109 also comprises an RF input section 116 which receives the control channel signal via the RF splitter 98 and downconverts it to baseband. The control channel receive signal ranges in frequency from 50 and 860 MHz. The baseband output of the RF input section 116 is input to the GMSK demodulator 112 which outputs demodulated data to the CPU 100.

The operation of the CUI is determined by various parameters loaded into it via the PC and stored in nonvolatile memory incorporated within the CUI. Parameters such as configuration parameters, can be read by the PC. The configuration parameters include, but are not limited to, the parameters listed in the following table.

| Parameter | Description/Comment |
|---|---|
| Main receive frequency | between 50 and 860 MHz |
| Main transmit frequency | between 5 and 50 MHz |
| Control channel receive frequency | between 50 and 860 MHz |
| Control channel transmit frequency | between 5 and 50 MHz |
| Interface type definition | E1; T1 NI/CI; T1 DSX-1; V.35; Ethernet |
| Signal encoding method | for E1: HD3B, AMI or B8ZS; for T1: AMI or B8ZS |
| LBO attenuation level type A, B, C | for A: 0 dB; for B: 7.5 dB; for C: 15.0 dB |
| Line lengths between CUI and DSX-1 cross connect | for T1 DSX-1: 0 to 133 ft; 133 to 266 ft; 266 to 399 ft; 399 to 533 ft; 533 to 655 ft |
| Operation rate | for E1: 2.048 Mbps; for T1: 1.544 Mbps; for Ethernet: 1.544 or 2.048 Mbps; for V.35: Nx64 Kbps where N equals 1 to 32. |
| Error correction handling | 1. no FEC<br>2. FEC with 7/8 rate<br>3. FEC with 3/4 rate |
| Identification number of the CUI | unique 4 byte address |
| CUI data link transmission level | dynamic range is 24 dB within 1 dB steps |
| CUI GMSK transmission level | dynamic range is 20 dB in 1 dB steps |
| Data link tuner calibration | correction of the IF frequency deviation of the RF tuner 80 (FIG. 2) |
| CUI software version number | read only parameter |
| CUI hardware version number | read only parameter |

The CUI functions to monitor the status of various different points during its operation. The CUI reports the status of these points to the NMS 40 (FIG. 2) whenever the NMS makes a request for status. The various points monitored for status purposes include, but are not limited to, the following:

1. Faults in the signal received from the terminal equipment: for E1 and T1 interfaces, the faults are LOS. AIS and BPV; for the V.35 interface, the indications are LOS and DTR; for an Ethernet interface, the indications are Link integrity and WAN active.
2. Faults in the signal received from the CATV network. For all interfaces, the indications are RF-LOS and BER.
3. Faults in an internal component of the CUI, i.e., faults in hardware components which cause faulty operation of the CUI. The status of these components can be determined by activation of a BIT function.

The CUI of the present invention also incorporates diagnostic functionality, which will now be described in more detail. In general, diagnostic operations are provided in order to isolate faulty components on the link in addition to detecting the nature of the fault. The link comprises a first CUI in a first location, a second CUI in a second location, the CATV network or one of the two terminal equipments.

The diagnostic operations that can be performed to isolate faulty components on the link include, but are not limited to, the following:

1. Bi-directional local loopback is performed in the CUI and is described in more detail below. Commands are provided for the activation and deactivation of local loopback.
2. Activation of loopback in the digital path. This performs remote loopback which facilitates testing of another CUI along with the CATV network in both directions. Commands are provided for the activation and deactivation of remote loopback. This type of diagnostic is also described in more detail below.

3. Muting of modem transmission. This is used for muting and demuting the modulator transmission for isolating the source of interference within the channel bandwidth used by the link.
4. Activation of a random series of transmissions and associated reception. This can be used for error rate testing and reporting. Commands are provided for the activation and deactivation of this series of transmissions. The series comprises pseudo random number (PN) sequences with code of (10,3) and (23,18).
5. Activation of the transmission of the AIS signal in the direction of the nearest attached terminal equipment. Commands are provided for the activation and deactivation of the transmission of the AIS signal.
6. Activation of a soft reset. When this command is applied, the CUI simulates in software, a hardware reset sans power up processing.
7. Activation of a BIT flow function. This command is used to get an exact indication of the faulty device within the CUI.

In addition, the CUI optionally comprises a watchdog mechanism that functions to reset the CUI in the event it hangs up. When the watchdog mechanism is enabled and the software hangs for some reason, a hardware reset of the CUI will be effected after a predetermined period of time.

Figure 3:
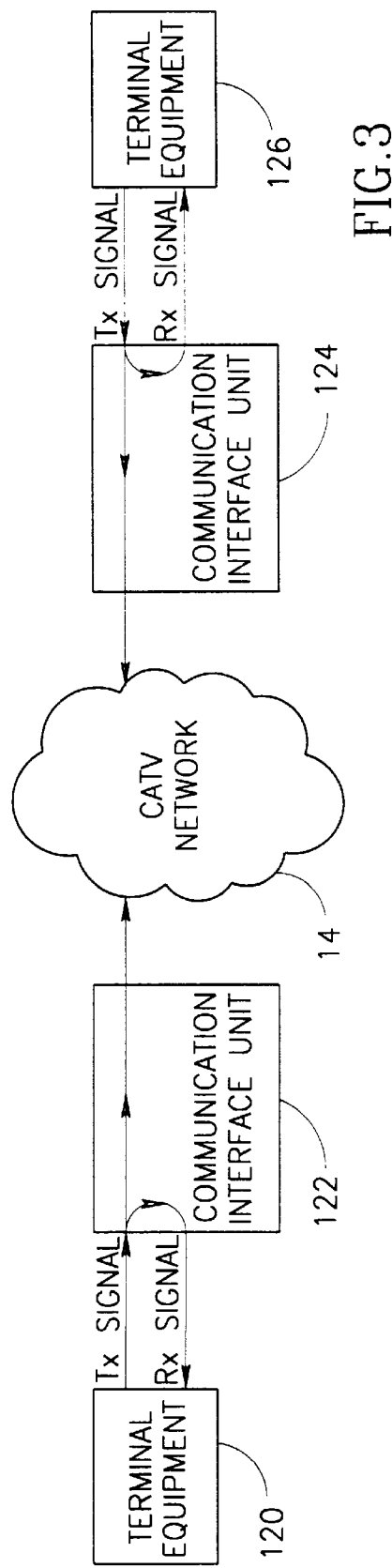
FIG. 3 is a block diagram illustrating the local loopback mode of the communications interface unit.

The local loopback diagnostics of the CUI will now be described in more detail. A lock diagram illustrating the local loopback mode of the communications interface unit is shown in FIG. 3. As described earlier, the CUI is capable of performing local loopback diagnostics. Two CUIs 122, 124 are shown coupled to CATV network 14. Terminal equipment 120 is coupled to CUI 122 and terminal equipment 126 is coupled to CUI 124. In accordance with a control command sent from the NMS (either locally or remotely), for example, the CUI performs local loopback on the path at the nearest terminal equipment to which it is connected. The data received from the terminal equipment by the CUI is returned back to the terminal equipment. While in local loopback, the CUI transmits RF onto the CATV network in order to maintain the channel transmission.

The CUI functions to relay the input signal from the terminal equipment back as an output signal to the terminal equipment itself. Thus, the data sent by terminal equipment 126 denoted by Tx SIGNAL is relayed back by the CUI 124 to the terminal equipment 126 as Rx SIGNAL. Similarly, the data sent by terminal equipment 120 denoted by Tx SIGNAL is relayed back by the CUI 122 to the terminal equipment 120 as Rx SIGNAL.

Figure 4:
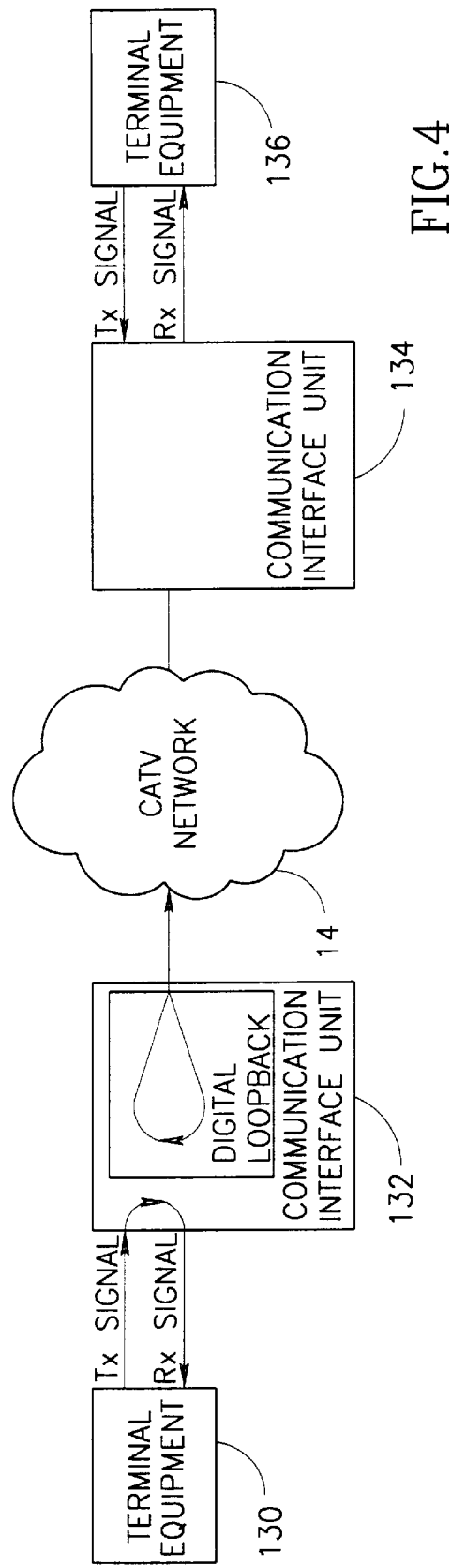
FIG. 4 is a block diagram illustrating the remote loopback mode of the communications interface unit.

The remote loopback diagnostics of the CUI will now be described in more detail. A block diagram illustrating the remote loopback mode of the communications interface unit is shown in FIG. 4. As described earlier, the CUI is capable of performing remote loopback diagnostics. Two CUIs 132, 134 are shown coupled to CATV network 14. Terminal equipment 130 is coupled to CUI 132 and terminal equipment 136 is coupled to CUI 134. In accordance with a control command sent from the NMS (either locally or remotely), for example, the CUI performs remote loopback on the digital path towards the far end CUI connected to terminal equipment. Similarly, the far end CUI performs digital loopback toward the near end CUI. The data transmitted by the near end terminal equipment is returned by the far end via the CATV network.

With reference to FIG. 4, CUI 132 is in remote loopback on one side and local loopback on the other side. Data sent from terminal equipment 130 denoted Tx SIGNAL is returned to it via the CUI 132 as the signal denoted Rx SIGNAL. Data sent from terminal equipment 136 denoted Tx SIGNAL is transmitted by CUI 134 to CUI 132 via CATV network 14. CUI 132, in digital loopback, transmits the received signal back to the CUI 143 over the CATV network. The signal Rx SIGNAL is returned to the terminal equipment 136, completing the remote loopback path.

While the invention has been described with respect to a limited number of embodiments, it will be appreciated that many variations, modifications and other applications of the invention may be made.

What is claimed is:

1. A data communication device for transmitting data from a terminal equipment over an analog based communication network, said device for transmitting data received from said network to the terminal equipment, said device comprising:

first modem means comprising:
first transmitter means for interfacing to said terminal equipment, receiving data to be transmitted, modulating and upconverting said data for transmission onto an upstream data channel over said network; and
first receiver means for receiving data from said network over a downstream data channel, downconverting and demodulating said data and interfacing to said terminal equipment for transmission of said received data;

control means for managing and configuring said device in accordance with commands received from a network management system (NMS);

second modem means comprising:
second transmitter means for receiving control data to be transmitted from said control means, modulating and upconverting said control data for transmission onto said upstream control channel over said network; and
second receiver means for receiving control data from said network over said downstream control channel, downconverting and demodulating said control data and interfacing to said terminal equipment for transmission of said received data to said control means;

processor means for controlling said first and second modem means; and splitter means for interfacing said first transmitter means, said first receiver means, said second transmitter means, and said second receiver means to said network.

2. The device according to claim 1, wherein said first transmitter means comprises transmitter interface means adapted to interface to E1 terminal equipment.

3. The device according to claim 1, wherein said first transmitter means comprises transmitter interface means adapted to interface to T1 terminal equipment.

4. The device according to claim 1, wherein said first transmitter means comprises transmitter interface means adapted to interface to DSX-1 terminal equipment.

5. The device according to claim 1, wherein said first transmitter means comprises transmitter interface means adapted to interface to V.35 terminal equipment.

6. The device according to claim 1, wherein said first transmitter means comprises transmitter interface means adapted to interface to Ethernet terminal equipment.

7. The device according to claim 1 wherein said first receiver means comprises receiver interface means adapted to interface to E1 terminal equipment.

8. The device according to claim 1, wherein said first receiver means comprises receiver interface means adapted to interface to T1 terminal equipment.

9. The device according to claim 1, wherein said first receiver means comprises receiver interface means adapted to interface to DSX-1 terminal equipment.

10. The device according to claim 1, wherein said first receiver means comprises receiver interface means adapted to interface to V.35 terminal equipment.

11. The device according to claim 1, wherein said first receiver means comprises receiver interface means adapted to interface to Ethernet terminal equipment.

12. The device according to claim 1, wherein said first transmitter means comprises:

a transmitter interface for interfacing with said terminal equipment and adapted to received data therefrom;

scrambling means for scrambling data input from said transmitter interface;

forward error correcting code encoding means for encoding the data output from said scrambling means with an error correcting code;

modulator means for modulating a digital signal input thereto;

D/A converter means for converting the digital output of said modulator means into an analog signal; and upconverter means for modulating said analog signal up to an RF frequency in the range 50 to 860 MHz for transmission over said network.

13. The device according to claim 12, wherein said modulator comprises a quadrature phase shift keying (QPSK) modulator.

14. The device according to claim 1, wherein said first receiver means comprises:

downconverter means for demodulating an RF signal in the range 50 to 860 MHz received over said network;

A/D converter means for converting the analog output of said downconverter means into a digital signal;

demodulator means for demodulating a digital signal input thereto;

forward error correcting code decoding means for decoding the data output from said demodulator means;

descrambling means for descrambling data input from said forward error correcting code decoding means; and a receiver interface for interfacing with said terminal equipment and adapted to transmit data thereto.

15. The device according to claim 14, wherein said demodulator comprises a quadrature phase shift keying (QPSK) demodulator.

16. The device according to claim 1, wherein said second transmitter means comprises a Gaussian Minimum Shift Key (GMSK) modulator.

17. The device according to claim 1, wherein said second receiver means comprises a Gaussian Minimum Shift Key (GMSK) demodulator.

18. The device according to claim 1, further comprising a local communications interface for locally interfacing a network management system to said device.

19. The device according to claim 18, wherein said communications interface comprises an RS-232 interface.

* * * * *